United States Patent [19]
Faccia

[11] Patent Number: 5,465,914
[45] Date of Patent: Nov. 14, 1995

[54] TRANSMISSION FOR COMBINED SHREDDING AND MIXING TRUCKS FOR FIBROUS ZOOTECHNICAL PRODUCTS

[76] Inventor: Tiziano Faccia, Via Padova 102, 35026 Conselve (Prov. of Padova), Italy

[21] Appl. No.: 172,951

[22] Filed: Dec. 27, 1993

[51] Int. Cl.⁶ .................................................. B02C 19/00
[52] U.S. Cl. .................................. 241/101.71; 241/101.2
[58] Field of Search ........................... 241/101.7, 101.2, 241/277, 285.1

[56] References Cited

U.S. PATENT DOCUMENTS

| | | |
|---|---|---|
| 2,896,923 | 7/1959 | Luscombe . |
| 3,776,528 | 12/1973 | Toto ................................ 241/101.7 X |
| 4,026,528 | 5/1977 | Kline et al. ...................... 241/101.7 X |
| 4,026,529 | 5/1977 | Kline . |
| 4,793,561 | 12/1988 | Borda ............................... 241/101.2 X |

FOREIGN PATENT DOCUMENTS

| | | |
|---|---|---|
| 0003813 | 9/1979 | European Pat. Off. . |
| 0393583 | 10/1990 | European Pat. Off. . |
| 1553902 | 1/1969 | France . |
| 2107226 | 5/1972 | France . |
| 2540400 | 8/1984 | France . |

*Primary Examiner*—Douglas D. Watts
*Attorney, Agent, or Firm*—Guido Modiano; Albert Josif

[57] ABSTRACT

A transmission is disclosed for trucks of the type having a wheeled chassis that is towed or independently powered and supports a substantially inverted frustum-shaped container which is upwardly open and contains a scroll with a vertical axis for shredding and mixing fibrous products. The transmission comprises a tracked-type epicyclic reduction unit which is mounted on the bottom of the container and supports the scroll in a cantilevered manner. The reduction unit is coupled to a hydraulic motor connected to a pump, which is in turn coupled to a drive unit.

11 Claims, 3 Drawing Sheets

TRANSMISSION FOR COMBINED SHREDDING AND MIXING TRUCKS FOR FIBROUS ZOOTECHNICAL PRODUCTS

BACKGROUND OF THE INVENTION

The present invention relates to a transmission for combined shredding and mixing trucks for fibrous zootechnical products.

Mixing trucks are known in the zootechnical field that are constituted by a wheeled chassis which is towed or self-propelled with an independent power plant and supports a substantially inverted frustum-shaped container, which is open at the top and contains a scroll or helix with a vertical axis for shredding and mixing fibrous products for feeding livestock.

The scroll, which has a substantially conical profile, lies along a shaft which is rotatably coupled to the chassis in a downward region and, in an upward region, to a cross-member which is fixed between two opposite parts of the edge of the container.

A mechanical transmission with a reduction unit, i.e., a bevel gear pair and gear-based couplings, is currently used to transmit the motion from the driving motor to the scroll shaft.

Although this type of transmission has been used extensively so far, it has been found to have some drawbacks which are mainly due to the considerable stresses to which it is subjected.

The presence of the gears produces overheating and considerable load losses that require high motor power levels.

Another drawback is due to the fact that the upper supporting cross-member of the shaft that supports the scroll creates an obstacle, when feeding large bales into the container, and consequently creates considerable problems in operation.

SUMMARY OF THE INVENTION

An aim of the present invention is to provide a transmission for combined shredding and mixing trucks for fibrous zootechnical products that allows to overcome the drawbacks described above in known types.

A consequent primary object is to provide a transmission that allows to mount the scroll in a cantilevered manner, i.e. without the upper supporting cross-member.

Another important object is to minimize the dimensions of the part of the transmission that is coupled to the scroll shaft.

Another important object is to facilitate and quicken the assembly of the scroll.

Yet another object is to provide a transmission which has a lower cost than current ones.

Another object is to provide a transmission that can be manufactured with commercially available components.

With the foregoing and other objects in view, there is provided a transmission for combined shredding and mixing trucks for fibrous zootechnical products, comprising a wheeled chassis supporting a substantially inverted frustum-shaped container that is open at the top and contains a scroll with a vertical axis for shredding and mixing said fibrous products, said transmission being characterized in that it comprises an epicyclic reduction unit mounted on the bottom of said container and supporting said scroll in a cantilevered manner.

Advantageously, the transmission comprises at least one hydraulic pump directly coupled to the actuation motor of the truck; said pump is connected to a hydraulic motor which is coupled to said epicyclic reduction unit.

BRIEF DESCRIPTION OF THE DRAWINGS

Further characteristics and advantages of the invention will become apparent from the detailed description of an embodiment thereof, illustrated only by way of nonlimitative example in the accompanying drawings, wherein.

DESCRIPTION OF THE PREFERRED EMBODIMENTS

Figure 1:
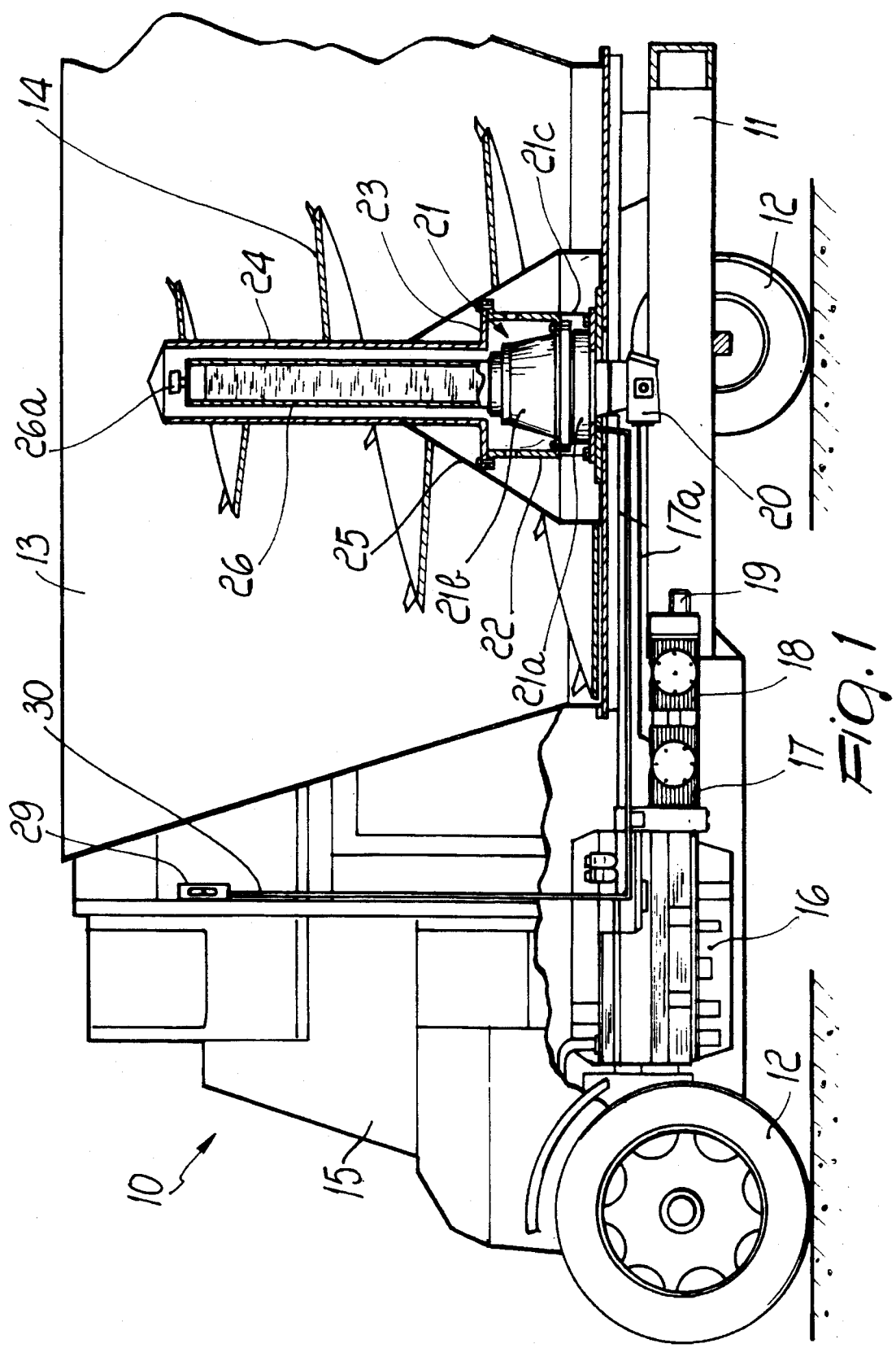
FIG. 1 is a partially sectional schematic view of a combined shredding and mixing truck for fibrous products which has a transmission according to the invention.
Figure 2:
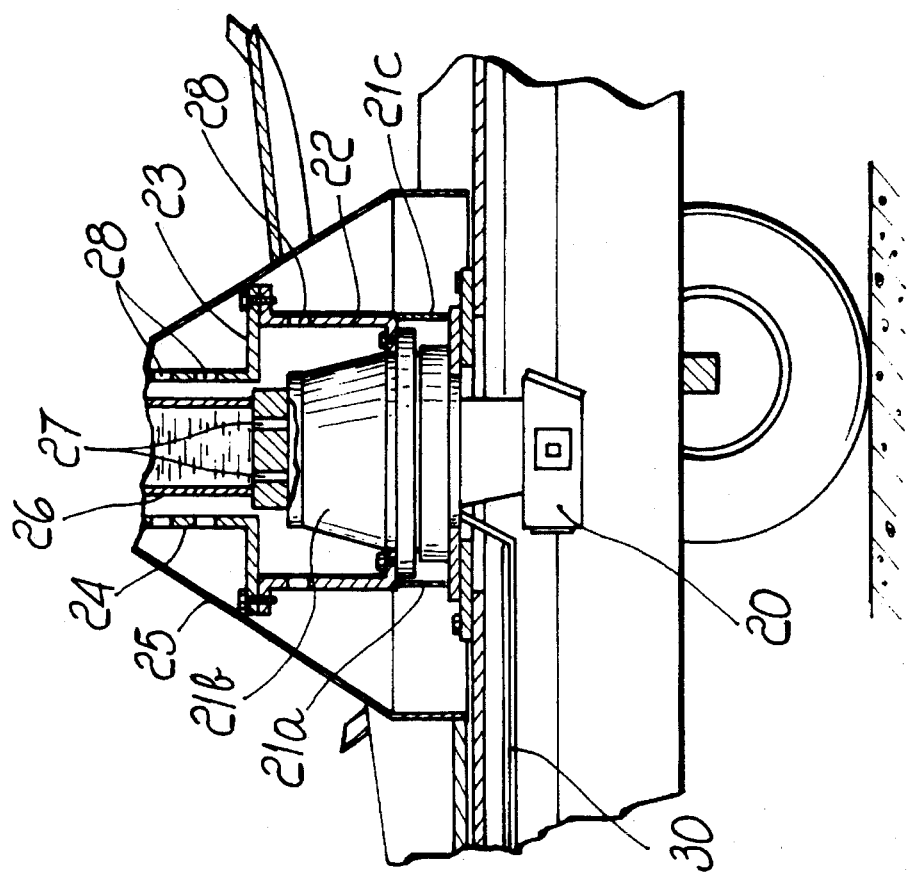
FIG. 2 is an enlarged-scale detail view of the part of the transmission that is fixed to the bottom of the container.

With reference to the above described FIGS. 1 and 2, a combined shredding and mixing truck for fibrous zootechnical products, of the self-propelled type with an independent power plant, is generally designated by the reference numeral 10 and comprises a chassis 11 with wheels 12, on which a container 13 is mounted; said container is shaped substantially like an inverted truncated cone that is open upward, and contains a scroll or helix that has a vertical axis 14 and a substantially conical profile.

A maneuvering cab 15 is furthermore mounted on the chassis together with an internal-combustion engine 16 that provides both forward or reverse movement of said chassis and the rotation of the scroll 14.

According to the invention, a double variable-delivery hydraulic pump is coupled to the drive unit 16; a first pump 17 drives the scroll, and a second pump 18 drives the truck.

A third auxiliary pump 19 is furthermore connected to these two pumps and drives various components of the machine.

The first pump 17 is connected, by means of ducts 17a, to a hydraulic motor 20 which is coupled to a tracked-type epicyclic reduction unit 21 mounted at the bottom of the container 13.

The reduction unit 21 has a first part 21a bolted to the bottom of the container 13. A tubular spacer 22 is axially connected, i.e., bolted to the reduction unit 21, so that a part 21b of the reduction unit lies above the first part 21a; a base flange 23 connected to the lower end of the shaft 24 that supports the scroll 14 is in turn bolted to the tubular spacer.

The elements 21a and 21b that compose the epicyclic reduction unit 21 can naturally rotate with respect to one another. As it is clearly seen in FIGS. 1–5, the spacer 22 is in fact connected at the base of the second part 2b of he reduction unit 21 and therefor the shaft can rotate therewith about the same vertical axis.

A dust-tight ring 21c is arranged outside said elements.

A bell-shaped element 25, suitable to protect the reduction unit 21, is welded onto the shaft 24, which is of the cantilevered type with a free end thereof extending up towards the open top of the container.

The tracked-type epicyclic reduction unit 21 is very compact, although it has very high reduction ratios and axial and radial load-bearing characteristics that are suitable to withstand the stresses applied to it by the scroll.

A tank 26 for the lubricating oil, with an upper venting plug 26a, extends from the element 21b inside the shaft 24.

The interior of the tank 26 is connected, by means of holes 27, to the interior of the reduction unit 21, and the shaft 24 and the spacer 22 have holes 28 for the outflow of the air vented from the tank 26.

An auxiliary tank 29 is located in a region that is visible from outside and is connected to the reduction unit 21 by means of a tube 30 with an indicator for the level of the oil contained in the tank 26 (principle of communicating vessels) and a vent.

Figure 3:
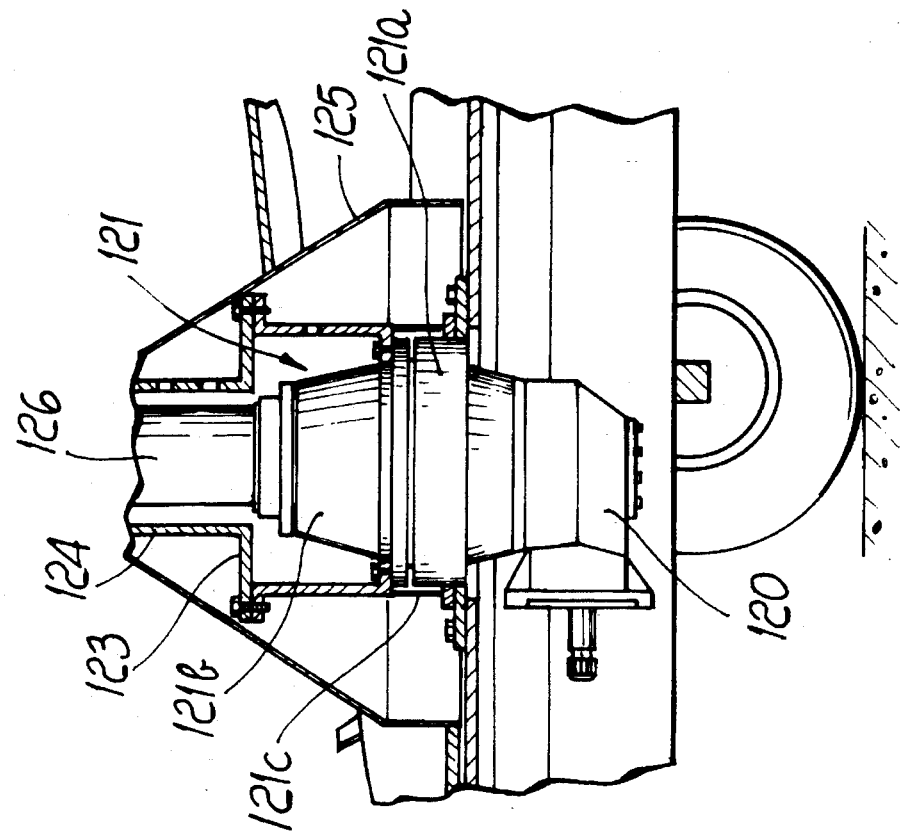
FIG. 3 is an enlarged-scale detail view of a first embodiment of the transmission.

In an alternative embodiment, illustrated in FIG. 3, the epicyclic reduction unit, now designated by the reference numeral 121, is coupled to a bevel gear pair 120 which is connected to the motor by means of a traditional mechanical transmission which is not illustrated.

As in the preceding case, the flange 123 of the shaft 124 is mounted on the reduction unit 121 by means of a spacer 122 and bolts.

Furthermore, there are again a bell-shaped protection element 125 and an oil tank 126 in the shaft 124.

Figure 4:
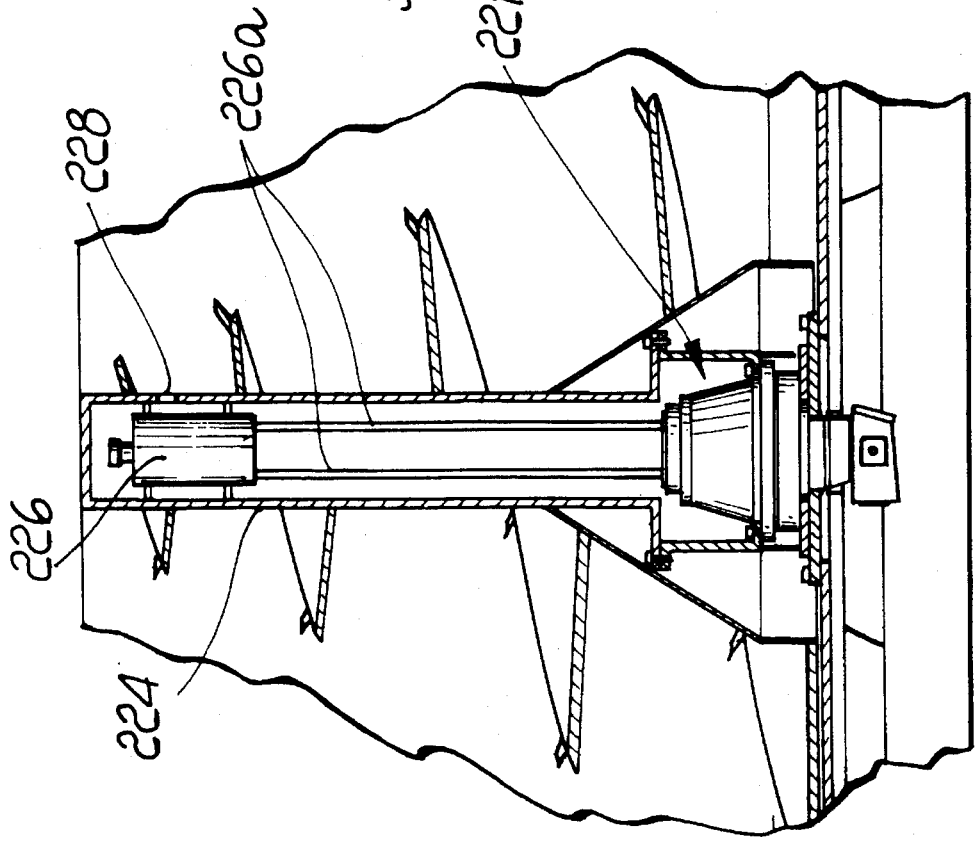

With reference now to another embodiment, shown in FIG. 4, the oil tank, now designated by the reference numeral 226, is constituted by a container which is fixed in an upper region inside the shaft 224 and is connected to the reduction unit 221 by means of pipes 226a.

The air venting holes 228 are formed directly on the shaft 224 below the spiral.

Figure 5:
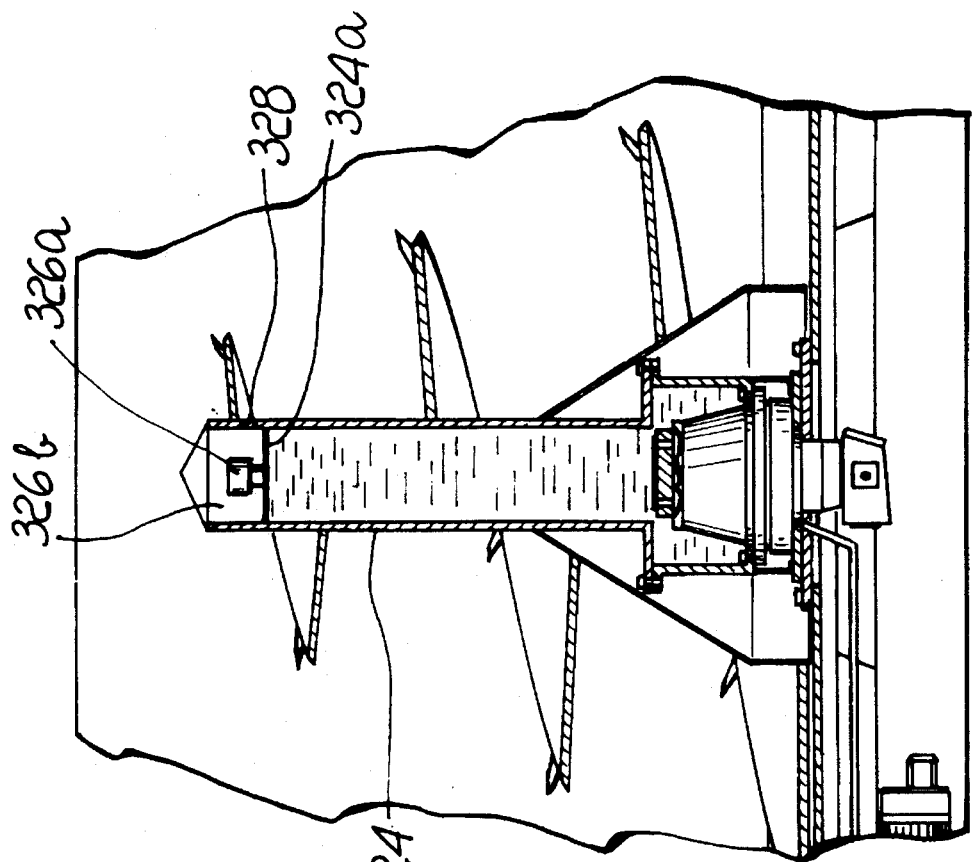
FIGS. 4 and 5 are detail views of second and third embodiments of the transmission.

Finally, with reference to a further embodiment, shown in FIG. 5, the shaft, now designated by the reference numeral 324, constitutes the oil tank, with an upper partition 324a and a venting plug 326a, an upper free chamber 326a and venting holes 328.

It is again possible to provide the auxiliary tank with a level indicator.

In practice it has been observed that the intended aim and objects of the present invention have been achieved.

The transmission is in fact characterized by limited dimensions and low heating and load losses, and in the specific case of the tracked epicyclic reduction unit it can withstand intense axial and radial loads.

This has allowed to eliminate the drawbacks observed so far in combined shredding and mixing trucks for fibrous products and to mount the scroll in a cantilevered manner with considerable advantages from the point of view of operation (a non-cantilevered scroll can nonetheless also be mounted).

Finally, the in-line mounting of the pumps has allowed to eliminate the coupling unit generally provided in transmissions between motors and pumps and the associated gears (with lower losses and less heating).

It should furthermore be noted that this transmission can also be mounted on towed trucks.

In practice, the materials employed, so long as they are compatible with the contingent use, as well as the dimensions, may be any.

I claim:

1. A transmission in a combined shredding and mixing truck for fibrous zootechnical products, the truck comprising a wheeled chassis that is towed or independently powered and supports a substantially inverted frustum-shaped container which is open at the top and contains a scroll with a vertical axis for shredding and mixing said fibrous products, the transmission comprising an epicyclic reduction unit mounted on said chassis and a vertically upstanding shaft having a first free end thereof projecting towards said open top of the container, said shaft supporting said scroll thereby said scroll extending upwardly from said reduction unit, wherein said reduction unit is substantially composed of two parts that are rotatably coupled to one another on a same axis, a first part being bolted to the bottom of said container and a second part being axially connected to a second lower end of said shaft for rotating therewith, and said shaft supporting said scroll.

2. Transmission according to claim 1, wherein a tubular spacer is bolted onto said second part of said reduction unit, a base flange of the shaft of said scroll being in turn bolted onto said spacer.

3. Transmission according to claim 1, wherein a bell-shaped element for protecting said reduction unit is welded to the shaft of said scroll.

4. A transmission in a combined shredding and mixing truck for fibrous zootechnical products, the truck comprising a wheeled chassis that is towed or independently powered and supports a substantially inverted frustum-shaped container which is open at the top and contains a scroll with a vertical axis for shredding and mixing said fibrous products, the transmission comprising an epicyclic reduction unit mounted on said chassis and supporting said scroll thereby said scroll extending upwardly from said reduction unit, wherein a tank for the lubricant of said reduction unit is located inside the shaft of said scroll and is connected to the inside of said reduction unit.

5. Transmission according to claim 4, wherein said tank is constituted by a container which is arranged inside said shaft.

6. Transmission according to claim 4, wherein said tank is formed by the hollow interior of said scroll shaft.

7. Transmission according to claim 4, further comprising an auxiliary tank located in a visible region and provided with a level indicator is connected to said tank.

8. Transmission according to claim 4, wherein a dust-tight ring is arranged outside said epicyclic reduction unit.

9. A transmission in a combined shredding and mixing truck for fibrous zootechnical products, the truck comprising a wheeled chassis that is towed or independently powered and supports an open-top container which contains a scroll element arranged inside said container for shredding and mixing the fibrous products, the transmission comprising an epicyclic reduction unit and a vertically upstanding shaft having a first free end thereof projecting towards the open top of the container, said reduction unit having a first part which is fixedly mounted on said chassis and a second part being rotatably connected to said first part, said second part being further axially connected to a lower second end of said shaft for rotating therewith, said scroll element being supported on said shaft and extending upwardly from said reduction unit in a substantially vertical direction inside said container.

10. The transmission of claim 9, wherein said means for rotating said scroll element comprise a hydraulic motor which is coupled to said epicyclic reduction unit.

11. The transmission of claim 9, wherein the transmission further comprises a bevel gear pair which is coupled to said epicyclic reduction unit.

* * * * *